(12) United States Patent
Lin

(10) Patent No.: US 6,422,353 B1
(45) Date of Patent: Jul. 23, 2002

(54) ROTARY COUPLING FOR BRAKE ASSEMBLY OF CYCLES

(76) Inventor: Chang Hui Lin, No. 13, Ju Wei Lane, Gin Lin Tsuen, Siu Shui Hsiang, Chang Hua Hsien (TW), 504

( * ) Notice: Subject to any disclaimer, the term of this patent is extended or adjusted under 35 U.S.C. 154(b) by 0 days.

(21) Appl. No.: 09/793,809

(22) Filed: Feb. 26, 2001

(51) Int. Cl.[7] .................................................. B62L 1/00
(52) U.S. Cl. ................... 188/24.11; 280/279; 74/502.6; 74/489
(58) Field of Search ........................... 188/24.11, 24.22, 188/24.21, 20; 280/279, 264, 280, 276; 74/502.6, 489, 488

(56) References Cited

U.S. PATENT DOCUMENTS

| | | | | |
|---|---|---|---|---|
| 4,653,768 A | * | 3/1987 | Keys et al. .................. | 280/279 |
| 4,753,448 A | * | 6/1988 | Nagashima ............... | 188/24.22 |
| 4,770,435 A | * | 9/1988 | Cristie ......................... | 280/279 |
| 5,605,076 A | * | 2/1997 | Wu ............................. | 74/551.1 |
| 5,791,671 A | * | 8/1998 | Tang et al. .................. | 280/264 |
| 5,992,869 A | * | 11/1999 | Yi-Chen ...................... | 280/264 |
| 6,220,398 B1 | * | 4/2001 | Wu .......................... | 188/24.11 |
| 6,224,079 B1 | * | 5/2001 | Goring ........................ | 280/279 |

* cited by examiner

Primary Examiner—Jack Lavinder
Assistant Examiner—Mariano Sy
(74) Attorney, Agent, or Firm—Charles E. Baxley

(57) ABSTRACT

A brake device includes a brake lever, a brake shoe, a tube, a stem rotatably secured in the tube, two followers pivotally secured to the stem and the tube for supporting two brake cables, and a bearing coupling the followers together. The followers are rotatably secured to the stem and the tube and are sliding in concert with each other relative to the tube and the stem and are rotated relative to each other for allowing the cables to be operated and to be prevented from being twisted relative to each other when the stem is rotated relative to the tube.

9 Claims, 4 Drawing Sheets

US 6,422,353 B1

ROTARY COUPLING FOR BRAKE ASSEMBLY OF CYCLES

BACKGROUND OF THE INVENTION

1. Field of the Invention

The present invention relates to a brake assembly of a cycle, and more particularly to a brake assembly of a cycle having a rotary coupling for preventing the brake cable from being distorted or twisted.

2. Description of the Prior Art

Typical brake devices for cycles comprise a brake shoe attached to the fork member, a brake lever attached to the handle bar and coupled to the brake shoe with a brake cable. When the handle is rotated relative to the head tube of the cycle, the brake cable may be twisted or distorted.

The present invention has arisen to mitigate and/or obviate the afore-described disadvantages of the conventional brake devices for cycles.

SUMMARY OF THE INVENTION

The primary objective of the present invention is to provide a brake assembly of a cycle including a rotary coupling provided in the brake cable for preventing the brake cable from being distorted or twisted.

In accordance with one aspect of the invention, there is provided a brake assembly comprising a brake lever, a brake shoe, a tube, a stem rotatably secured in the tube, a first follower pivotally secured to the stem and rotatable in concert with the stem relative to the tube, a first brake cable coupled between the first follower and the brake lever, a second follower pivotally secured to the tube and rotatable in concert with the tube relative to the stem, a second brake cable coupled between the brake shoe and the second follower, and means for coupling the first follower and the second follower together. The first follower and the second follower are rotatably secured to and rotatable relative to the stem and the tube respectively, and are sliding in concert with each other relative to the tube and the stem by the coupling means, and are rotated relative to each other by the rotatably engaging of the stem in the tube. for allowing the second cable to be actuated by the first cable and for allowing the brake shoe to be actuated by the brake lever via the brake cables and the followers, and for preventing the first cable and the second cable from being twisted relative to each other when the stem is rotated relative to the tube.

The coupling means includes a bearing slidably engaged on the tube and the stem and coupled between the first and the second followers. The bearing preferably includes two members rotatably secured together and rotatable relative to each other and coupled to the first and the second followers.

The members of the bearing are pivotally secured to the first and the second followers respectively with a pivot axle. The members of the bearing each preferably includes an extension pivotally secured to the first and the second followers respectively with the pivot axle. The members of the bearing are preferably rings and are rotatably secured together with balls.

The tube and the stem each includes a fastener provided thereon, the first follower and the second follower each includes at least one oblong hole formed therein for slidably receiving the fasteners respectively and for slidably and pivotally securing the first and the second followers to the stem and the tube respectively.

A first clamp is further provided and secured on the stem. and a second clamp is further provided and secured on the tube for supporting the fasteners respectively. An arm is further provided and secured between the second clamp and the tube for reinforcing the second clamp and for stably and solidly securing the second clamp on the tube. A third clamp is preferably further provided and secured on the tube and secured to the arm for reinforcing the second clamp.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 3:
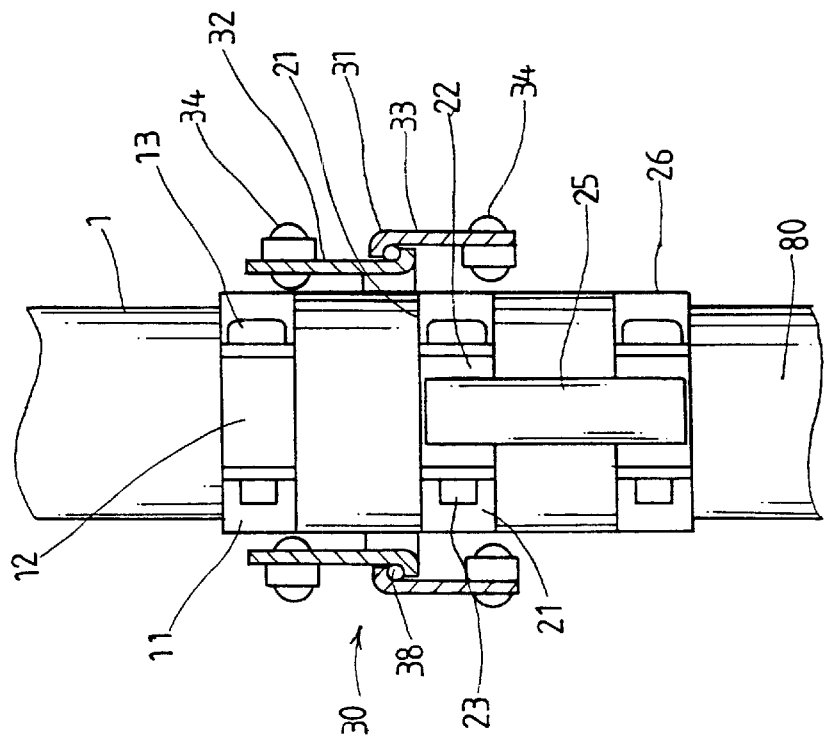
FIG. 3 is a partial cross sectional view showing the rotary coupling of the brake assembly.
Figure 1:
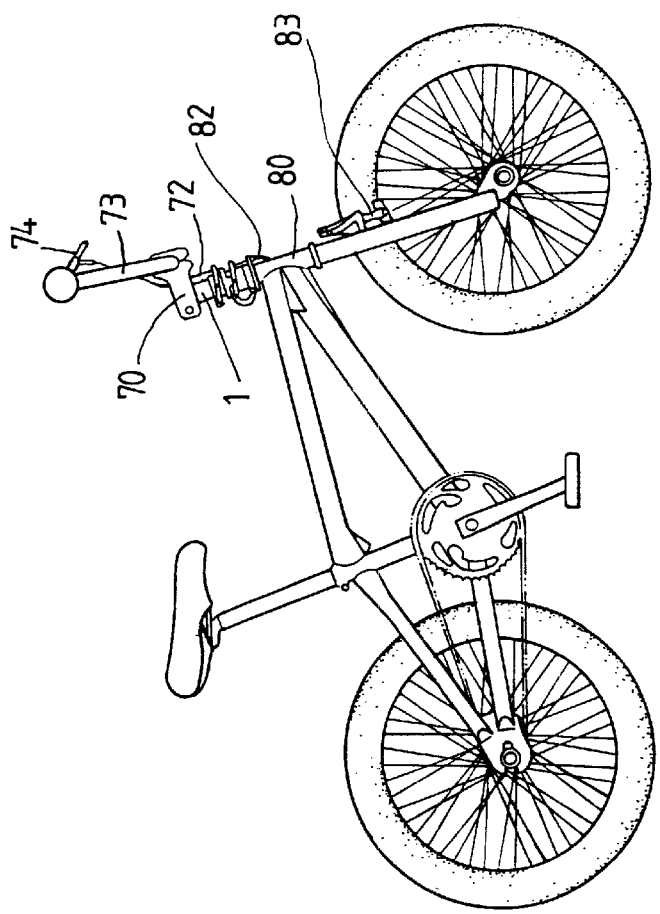
FIG. 1 is a plane view of a cycle having a brake assembly in accordance with the present invention.
Figure 2:
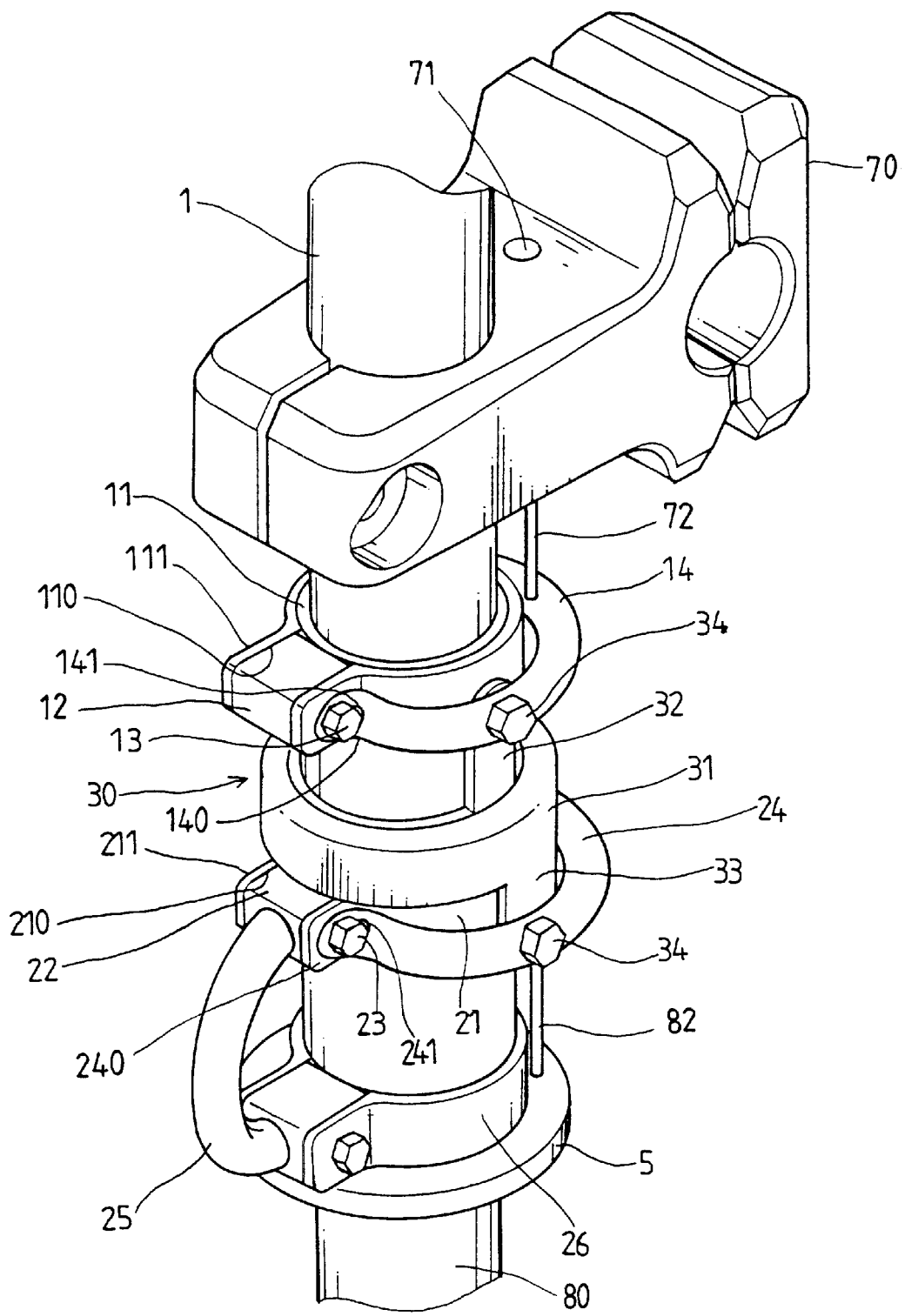
FIG. 2 is a partial perspective view showing a rotary coupling of the brake assembly.

Referring to the drawings, and initially to FIGS. 1–4, a brake assembly in accordance with the present invention comprises a stem 1, such as a handlebar stem 1 rotatably received in a tube or a head tube 80, a shank 70 secured on top of the handlebar stem 1 for supporting a handle member 73 and having an orifice 71 formed therein for threading with a first brake cable 72 which has an upper end coupled to a brake lever 74 that is attached to the handle member 73. A panel 5 is secured to the head tube 80 for supporting a second brake cable 82 which has one end secured to a brake shoe 83 or the like. The handlebar stem 1 and thus the shank 70 and the first brake cable 72 are rotatable relative to the head tube 80 and the second brake cable 82 due to the rotational engagement of the handlebar stem 1 in the head tube 80.

The brake assembly of the present invention is to provide a rotary coupling secured between the brake cables 72, 82 for preventing the brake cables from being distorted or twisted relative to each other. The rotary coupling includes two clamps 11, 21 secured to the handlebar stem 1 and the head tube 80 respectively such that the clamps 11, 21 may also be rotated relative to each other. The clamps 11, 21 each includes a pair of ears 111, 211 extended therefrom for forming and defining a space 110, 210 between the ears 111, 211, and each includes a block 12, 22 engaged between the ears 111, 211, and each includes a fastener 13, 23 engaged through the ears 111, 211 and the block 12, 22 for securing the clamps 11, 21 to the handlebar stem 1 and the head tube 80 respectively. For reinforcing purposes, a further clamp 26 may further be secured onto the head tube 80 and engaged with the panel 5 and coupled to the clamp 21 with an arm 25 for stably and solidly supporting the clamp 21 on the head tube 80.

The rotary coupling includes a rotary bearing 30 having two members, such as two rings 31, 32 slidably engaged on the handlebar stem 1 and the head tube 80. The rings 31, 32 of the rotary bearing 30 are rotatably secured together with balls 38 (FIG. 3) for allowing the rings 31, 32 to be rotated relative to each other. The rings 31, 32 each includes an extension 33 extended therefrom. Two followers 14, 24 are substantially C-shaped and each includes a middle portion pivotally coupled to the extensions 33 of the rings 31, 32 with a pivot axle 34 respectively for allowing the followers 14, 24 to be rotatable relative to the rings 31, 32 respectively. The followers 14, 24 each includes two ends 140 formed or provided in the rear portion thereof and and having an oblong hole 141, 241 formed therein for slidably receiving the fasteners 13, 23 respectively and for slidably and pivotally coupling the followers 14, 24 to the fasteners 13, 23 of the clamps 11, 21. The followers 14, 24 each includes a front portion having an aperture 142, 242 formed therein for threading and securing the brake cables 72, 82 respectively.

Figure 4:
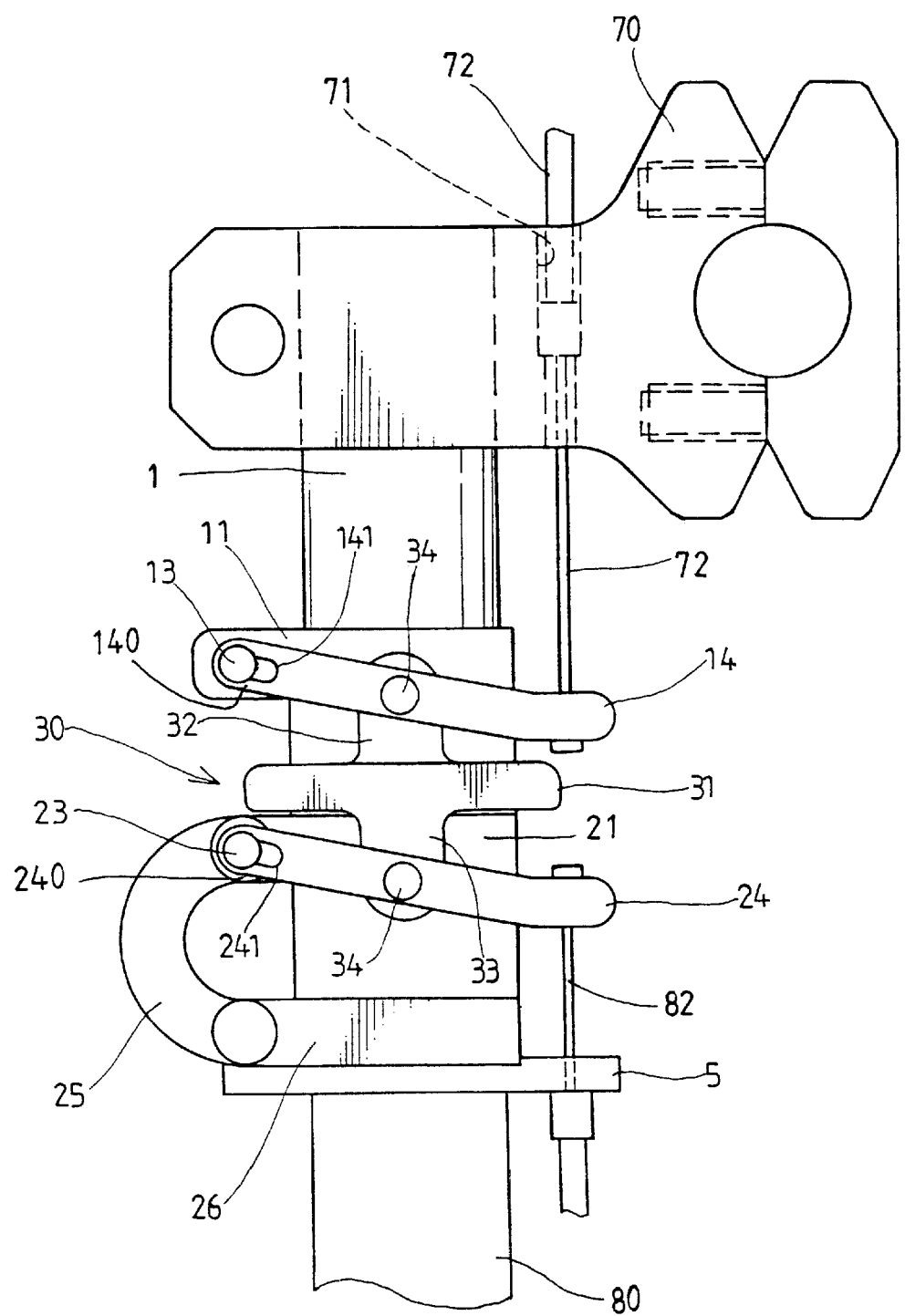
FIGS. 4 and 5 are plane views illustrating the operation of the rotary coupling of the brake assembly.
Figure 5:
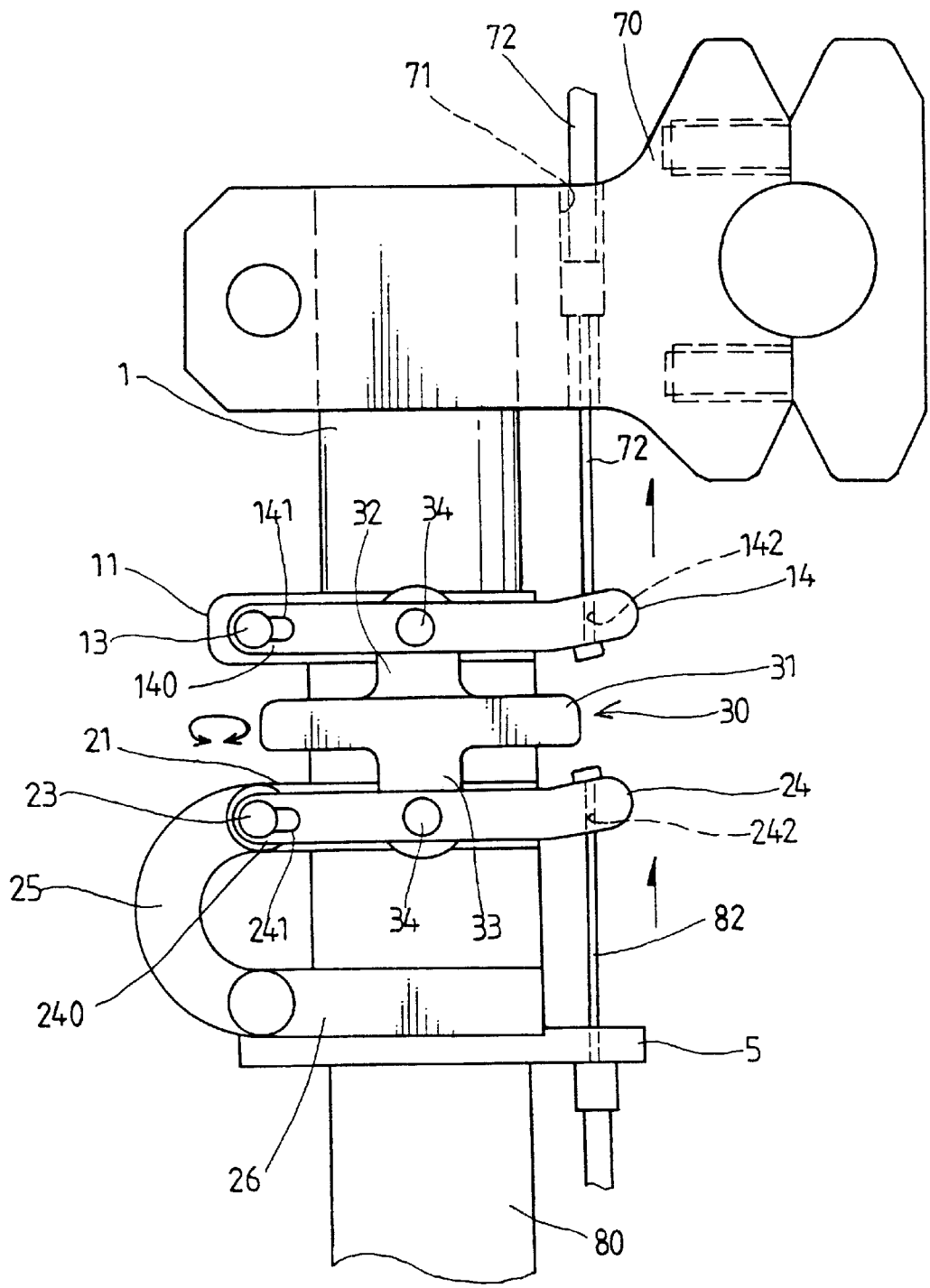

In operation, as shown in FIGS. 4 and 5, the rotary bearing 30 may be slided up and down along the handlebar stem 1 and the head tube 80, and the rings 31, 32 of the rotary bearing 30 and the followers 14, 24 may be rotated relative to each other, such that the brake cables 72, 82 will not be distorted or twisted relative to each other when the handlebar stem 1 is rotated relative to the head tube 80. The followers 14, 24 are rotatable relative to the rotary bearing 30 about the pivot axles 34, and the followers 14, 24 are slidably relative to the clamps 11, 21 by the sliding engagement of the fasteners 13, 23 in the oblong holes 141, 241 of the followers 14, 24, such that the rotary bearing 30 may be smoothly slided up and down along the handlebar stem 1 and the head tube 80, and such that the brake cable 82 may be pulled upward (FIG. 5) by the brake lever 74 via the brake cable 72 and the followers 14, 24 and the rotary bearing 30 when the handlebar stem 1 is rotated relative to the head tube 80.

Accordingly, the brake assembly of the cycle in accordance with the present invention includes a rotary coupling provided in the brake cable for preventing the brake cable from being distorted or twisted.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake assembly comprising:
   a brake lever,
   a brake shoe,
   a tube,
   a stem rotatably secured in said tube,
   a first follower pivotally secured to said stem and rotatable in concert with said stem relative to said tube,
   a first brake cable coupled between said first follower and said brake lever,
   a second follower pivotally secured to said tube and rotatable in concert with said tube relative to said stem,
   a second brake cable coupled between said brake shoe and said second follower, and
   means for coupling said first follower and said second follower together,
   said first follower and said second follower being rotatably secured to and rotatable relative to said stem and said tube respectively, and being sliding in concert with each other relative to said tube and said stem by said coupling means, and being rotated relative to each other by the rotatably engaging of said stem in said tube, for allowing said second cable to be actuated by said first cable and for preventing said first cable and said second cable from being twisted relative to each other when said stem is rotated relative to said tube, said tube and said stem each including a fastener provided thereon, said first follower and said second follower each including at least one oblong hole formed therein for slidably receiving said fasteners respectively and for slidably and pivotally securing said first and said second followers to said stem and said tube respectively.

2. The brake assembly according to claim 1, wherein said coupling means includes a bearing slidably engaged on said tube and said stem and coupled between said first and said second followers.

3. The brake assembly according to claim 2, wherein said bearing includes two members rotatably secured together and rotatable relative to each other and coupled to said first and said second followers.

4. The brake assembly according to claim 1 further comprising a first clamp secured on said stem, and a second clamp secured on said tube for supporting said fasteners respectively.

5. The brake assembly according to claim 4 further comprising an arm secured between said second clamp and said tube for reinforcing said second clamp.

6. The brake assembly according to claim 5 further comprising a third clamp secured on said tube and secured to said arm for reinforcing said second clamp.

7. A brake assembly comprising:
   a brake lever,
   a brake shoe,
   a tube,
   a stem rotatably secured in said tube,
   a first follower pivotally secured to said stem and rotatable in concert with said stem relative to said tube,
   a first brake cable coupled between said first follower and said brake lever,
   a second follower pivotally secured to said tube and rotatable in concert with said tube relative to said stem,
   a second brake cable coupled between said brake shoe and said second follower, and
   means for coupling said first follower and said second follower together, said coupling means including a bearing slidably engaged on said tube and said stem and coupled between said first and said second followers, said bearing including two members rotatably secured together and rotatable relative to each other and coupled to said first and said second followers, said members of said bearing being pivotally secured to said first and said second followers respectively with a pivot axle,
   said first follower and said second follower being rotatably secured to and rotatable relative to said stem and said tube respectively, and being sliding in concert with each other relative to said tube and said stem by said coupling means, and being rotated relative to each other by the rotatably engaging of said stem in said tube, for allowing said second cable to be actuated by said first cable and for preventing said first cable and said second cable from being twisted relative to each other when said stem is rotated relative to said tube.

8. The brake assembly according to claim 7, wherein said members of said bearing each includes an extension pivotally secured to said first and said second followers respectively with said pivot axle.

9. A brake assembly comprising:
   a brake lever,
   a brake shoe, a tube, a stem rotatably secured in said tube, a first follower pivotally secured to said stem and rotatable in concert with said stem relative to said tube, a first brake cable coupled between said first follower and said brake lever, a second follower pivotally secured to said tube and rotatable in concert with said tube relative to said stem, a second brake cable coupled between said brake shoe and said second follower, and means for coupling said first follower and said second follower together, said coupling means including a bearing slidably engaged on said tube and said stem and coupled between said first and said second followers, said bearing including two members rotatably secured together and rotatable relative to each other and coupled to said first and said second followers, said members of said bearing being rings and being rotatably secured together with balls, said first follower and said second follower being rotatably secured to and rotatable relative to said stem and said tube respectively, and being sliding in concert with each other relative to said tube and said stem by said coupling means, and being rotated relative to each other by the rotatably engaging of said stem in said tube, for allowing said second cable to be actuated by said first cable and for preventing said first cable and said second cable from being twisted relative to each other when said stem is rotated relative to said tube.

* * * * *